United States Patent
Miki et al.

(10) Patent No.: US 11,702,043 B2
(45) Date of Patent: Jul. 18, 2023

(54) HEATING APPARATUS FOR WASHER FLUID

(71) Applicant: MURAKAMI CORPORATION, Shizuoka (JP)

(72) Inventors: Ryoga Miki, Shizuoka (JP); Akira Fukai, Shizuoka (JP); Noriaki Masuda, Shizuoka (JP); Toshihiro Mochizuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 522 days.

(21) Appl. No.: 17/001,985

(22) Filed: Aug. 25, 2020

(65) Prior Publication Data

US 2021/0061231 A1 Mar. 4, 2021

(30) Foreign Application Priority Data

Aug. 30, 2019 (JP) ................................ 2019-158944

(51) Int. Cl.
*B60S 1/48* (2006.01)
*H05B 3/78* (2006.01)
*F24H 1/20* (2022.01)

(52) U.S. Cl.
CPC ................ *B60S 1/487* (2013.01); *F24H 1/20* (2013.01); *H05B 3/78* (2013.01)

(58) Field of Classification Search
None
See application file for complete search history.

(56) References Cited

U.S. PATENT DOCUMENTS

| 1,873,820 A | * | 8/1932 | Carpenter | F24H 1/121 392/493 |
| 3,476,915 A | * | 11/1969 | Rapsis | H05B 3/78 338/237 |
| 3,582,613 A | * | 6/1971 | Pies | F24H 1/121 392/491 |
| 4,514,617 A | * | 4/1985 | Amit | F24H 1/202 122/18.4 |
| 4,637,347 A | * | 1/1987 | Troy | F24D 3/082 122/15.1 |

(Continued)

FOREIGN PATENT DOCUMENTS

DE 10 2004 062 605 7/2006
JP 2005-171580 6/2005
(Continued)

*Primary Examiner* — Thor S Campbell
(74) *Attorney, Agent, or Firm* — Greenblum & Bernstein, P.L.C.

(57) ABSTRACT

A heating apparatus for a washer fluid according to an embodiment includes a container having an accommodation space in which a washer fluid is accommodated, an inlet part configured to charge the washer fluid into the accommodation space, an outlet part configured to discharge the washer fluid from the accommodation space, a heater provided in the accommodation space, the heater being configured to heat the washer fluid, and coils wound around the heater. The coils are in a spiral shape extending about the axis of the coils and are formed of wires in contact with the heater. The coils have close contact parts at which a plurality of wires is in close contact to each other in an extending direction of an axis.

5 Claims, 4 Drawing Sheets

(56) References Cited

U.S. PATENT DOCUMENTS

| | | | | |
|---|---|---|---|---|
| 6,118,934 | A * | 9/2000 | Tseng | A01K 63/065 219/510 |
| 6,321,036 | B1 * | 11/2001 | Huang | F24H 1/202 392/441 |
| 6,839,509 | B2 * | 1/2005 | Kuebler | F24H 9/20 392/484 |
| 7,657,961 | B2 * | 2/2010 | Shank | B60S 1/488 392/480 |
| 7,673,814 | B2 * | 3/2010 | Shank | F24H 1/188 219/202 |
| 7,912,360 | B2 * | 3/2011 | Gschwind | F02M 31/125 392/456 |
| 7,920,779 | B2 * | 4/2011 | Shirai | E03D 9/08 392/491 |
| 8,807,446 | B2 * | 8/2014 | Han | B60L 1/02 219/202 |
| 9,963,119 | B2 * | 5/2018 | Jarasson | F24H 1/12 |
| 10,017,162 | B2 * | 7/2018 | Sato | B60S 1/488 |
| 10,442,406 | B2 * | 10/2019 | Sato | F24H 1/009 |
| 10,563,889 | B2 * | 2/2020 | Wu | F28F 1/122 |
| 10,829,094 | B2 * | 11/2020 | Sato | B60S 1/488 |
| 2003/0138244 | A1 * | 7/2003 | Long | F24H 9/2028 392/480 |
| 2010/0037415 | A1 * | 2/2010 | Lansinger | B60S 1/487 165/41 |
| 2011/0126927 | A1 * | 6/2011 | Pyun | B60S 1/488 137/560 |
| 2012/0183281 | A1 * | 7/2012 | Sato | B60S 1/488 392/441 |
| 2018/0162327 | A1 * | 6/2018 | Lansinger | F24H 1/009 |

FOREIGN PATENT DOCUMENTS

| | | |
|---|---|---|
| JP | 2007-522023 | 8/2007 |
| JP | 2016-107676 | 6/2016 |
| WO | 2005/076735 | 8/2005 |
| WO | 2017/159373 A1 | 9/2017 |

* cited by examiner

HEATING APPARATUS FOR WASHER FLUID

TECHNICAL FIELD

The present disclosure relates to a heating apparatus for a washer fluid.

BACKGROUND

Conventionally, there is known a washer fluid that is injected onto a windshield, for example, for the purpose of melting frost attached to the windshield of a vehicle. On the vehicle, for example, a heating apparatus that heats this washer fluid is installed. WO 2017/159373 A describes a heating apparatus for a washer fluid.

This heating apparatus includes a cylindrical container having a bottom that is placed such that the bottom part is directed upwards, an inlet tube configured to charge a washer fluid into the internal space of the container, a first outlet tube and a second outlet tube configured to discharge the washer fluid from the internal space of the container, and a rod-shaped heater placed in the inside of the container.

The heater is placed along the center axis line of the container. The heating apparatus further includes a deflector that vertically partitions the internal space of the container, and the heater heats the washer fluid located on the upper side of the deflector. The deflector has a plurality of hole parts that vertically penetrates the deflector, and an inlet part charges the washer fluid to the lower side of the deflector.

SUMMARY

In the above-described heating apparatus for a washer fluid, the washer fluid charged to the lower side of the deflector passes through the plurality of individual hole parts on the deflector, and moves to the upper part of the deflector, and the heater heats the washer fluid that has moved to the upper part of the deflector. In the case in which this heater heats the washer fluid, boiling sounds sometimes occur in association with heating. The boiling sound is a sound that is generated by a rupture of bubbles having occurred in association with the heating of the washer fluid, which is possibly noise. Therefore, a more reliable reduction in the boiling sound is demanded.

An object of the present disclosure is to provide a heating apparatus for a washer fluid that can reduce a boiling sound.

A heating apparatus for a washer fluid according to the present disclosure includes: a container having an accommodation space configured to accommodate a washer fluid; an inlet part configured to charge a washer fluid into the accommodation space; an outlet part configured to discharge the washer fluid from the accommodation space; a heater provided in the accommodation space, the heater being configured to heat the washer fluid; and a coil wound around the heater. The coil is in a spiral shape extending about an axis of the coil, and the coil is formed of a wire in contact with the heater. The coil has a close contact part where a plurality of the wires is in close contact to each other in an extending direction of the axis.

In this heating apparatus for a washer fluid, the accommodation space configured to accommodate the washer fluid is provided with the heater configured to heat the washer fluid, and the wire of the coil is wound around the heater. Since the wire of the coil is wound around the heater configured to heat the washer fluid, the wire of the coil surrounds the circumferential surface of the heater, and thus a boiling sound in association with heating can be suppressed. That is, since the wire of the coil is interposed between the heater and the washer fluid, heat transfer between the heater and the washer fluid can be improved, and thus a boiling sound can be reduced. Furthermore, in this heating apparatus for a washer fluid, the coil has the close contact part at which the plurality of wires is in close contact to each other along the extending direction of the axis of the coil. That is, the coil has the close contact part at which the wire is wound in close contact to each other. In the close contact part, small bubbles are continuously generated in association with the heating of the washer fluid, and thus the generation of bubbles can be stabilized, in comparison with the case in which no close contact part is provided. That is, in the case in which no close contact part is provided, large bubbles intermittently grow in association with the heating of the washer fluid, and large bubbles rapidly grow, which sometimes causes a rupture. Therefore, since the generation of bubbles is unstable and large bubbles sometimes grow at once, the occurrence of a boiling sound is concerned. To this, since the coil having the close contact part is wound around the above-described the heater for washer fluid, small bubbles are continuously generated, and thus the growth of large bubbles can be suppressed. As a result, a boiling sound can be reduced.

The heating apparatus for a washer fluid may include a coil group including a plurality of the coils, and the plurality of coils included in the coil group may be placed such that the plurality of coils is arranged along the extending direction. In this case, in the coil group, the plurality of coils having the close contact part is wound, and thus the boiling sound can be more reliably reduced.

At least one of one end and another end of the wire of the coil may project in a direction apart from the heater. In this case, one end or the other end, which projects, of the wire is pinched with fingers, for example, and thus the diameter of the coil can be easily adjusted. Thus, the setting up of the coil to the heater can be easily performed.

At least one of one end and another end of the wire of the coil may be wound around the outlet part. In this case, the wire of the coil is wound around the outlet part, and thus the outlet part can be supported by the coil. The wire of the coil that is wound around the heater can be wound around the outlet part as well, and thus the removal of the coil can be more reliably suppressed.

A sensor part configured to measure a temperature of the washer fluid may be included, and at least one of one end and another end of the wire of the coil may be wound around the sensor part. In this case, the temperature of the washer fluid accommodated in the accommodation space can be measured by the sensor part. The wire of the coil that is wound around the heater can be wound around the sensor part as well, and thus the removal of the coil can be more reliably suppressed.

In accordance with the heating apparatus for a washer fluid according to the present disclosure, a boiling sound can be reduced.

DETAILED DESCRIPTION

In the following, an embodiment of a heating apparatus for a washer fluid according to the present disclosure will be described in detail with reference to the drawings. In the description of the drawings, components that are the same or equivalent are designated with the same reference signs, and the duplicate description is appropriately omitted. For easy understanding, the drawings are sometimes partially simplified or exaggerated, and dimensions, ratios, and any other parameters are not limited to ones described in the drawings.

Figure 1:
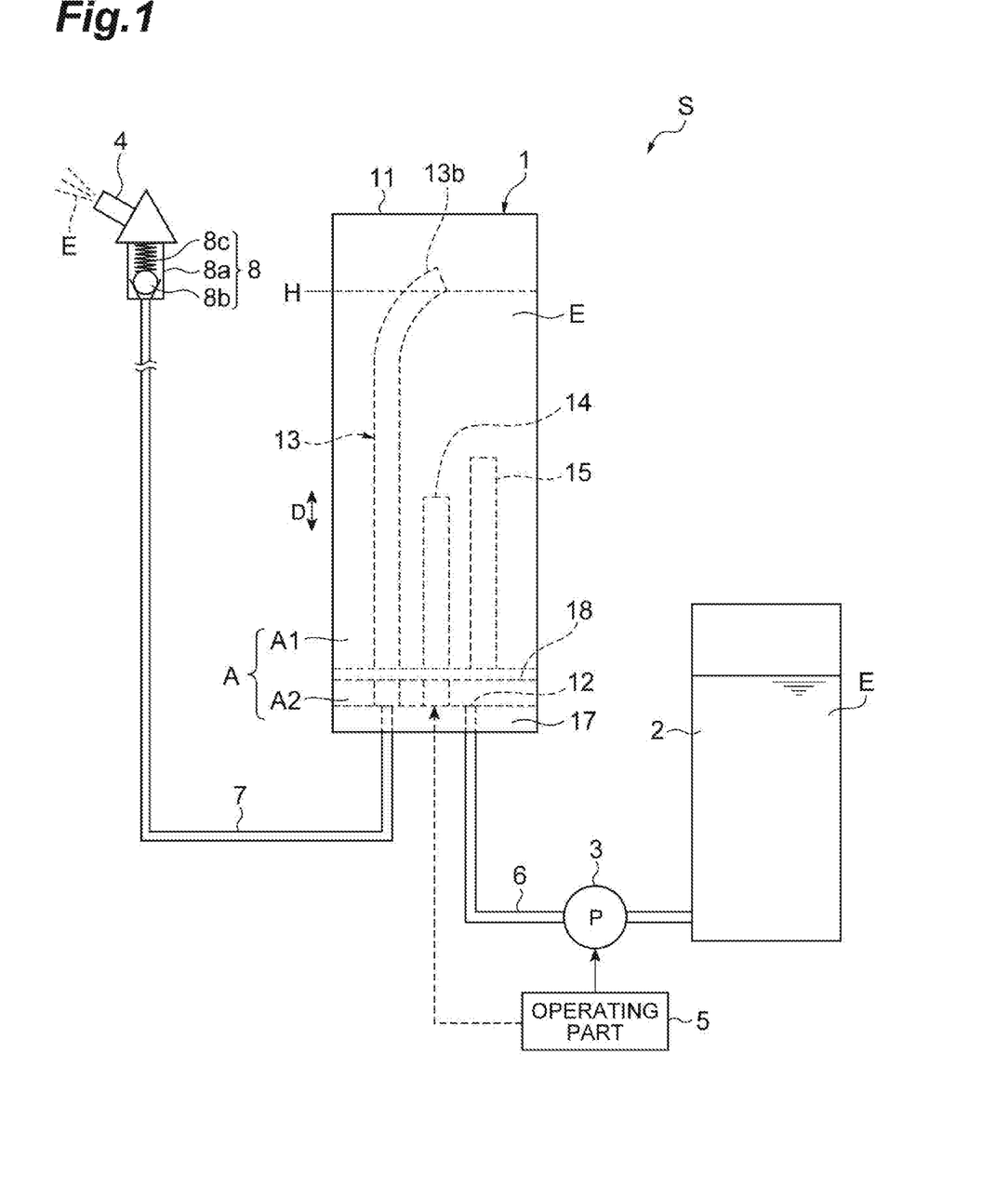
FIG. 1 is a diagram schematically showing a supply system for a washer fluid including a heating apparatus for a washer fluid according to an embodiment of the present disclosure.

First, an example will be described in which a heating apparatus 1 according to the present embodiment is applied to a supply system S for a washer fluid E of an automobile. Note that in FIG. 1, the heating apparatus 1 is simplified in the drawing. The supply system S is used as the deforester of a vehicle, for example. As shown in FIG. 1, the supply system S for the washer fluid E includes the heating apparatus 1, a washer fluid tank 2 that stores the washer fluid E, a washer fluid pump 3 provided on a first pipe 6 extending from the washer fluid tank 2, and a washer fluid nozzle 4 provided at a position opposite to the front window glass of the automobile.

The heating apparatus 1 is provided between the washer fluid pump 3 and the washer fluid nozzle 4. To the washer fluid pump 3 and the heating apparatus 1, an operating part 5 is connected. The operating part 5 is a part operated by the driver, for example, of the automobile, and operating the operating part 5 activates the washer fluid pump 3.

The heating apparatus 1 is connected to the washer fluid tank 2 through the first pipe 6. The heating apparatus 1 is connected to the washer fluid nozzle 4 through a second pipe 7. The second pipe 7 is provided with a check valve 8 that imparts a pressure to the washer fluid E accommodated in an accommodation space A located in the inside of the heating apparatus 1.

The check valve 8 has a housing 8a, a ball 8b that seals the end portion of the second pipe 7, and a spring 8c that presses the ball 8b to the second pipe 7 side at a constant pressure. The ball 8b and the spring 8c are accommodated in the inside of the housing 8a. In the supply system S, the discharge pressure by the washer fluid pump 3 exceeds a thrust by the check valve 8, and thus the washer fluid E is ejected from the washer fluid nozzle 4.

The heating apparatus 1 has a tubular container 11 having a bottom, which is placed such that the bottom part is directed upwards, for example, as an external component. As an example, the container 11 may include a cylindrical cover having a bottom, a foam case placed in the inside of the cover, and an inner container placed on the inner side of the foam case. The inner container may have a double structure through a vacuum layer, similar to a vacuum bottle, and the insulation effect exerted by the double structure keeps the warmth of the washer fluid E accommodated in the accommodation space A in the inside of the inner container. The container 11 has a cover part 17 that seals the above-described cylindrical cover having a bottom.

Figure 2:
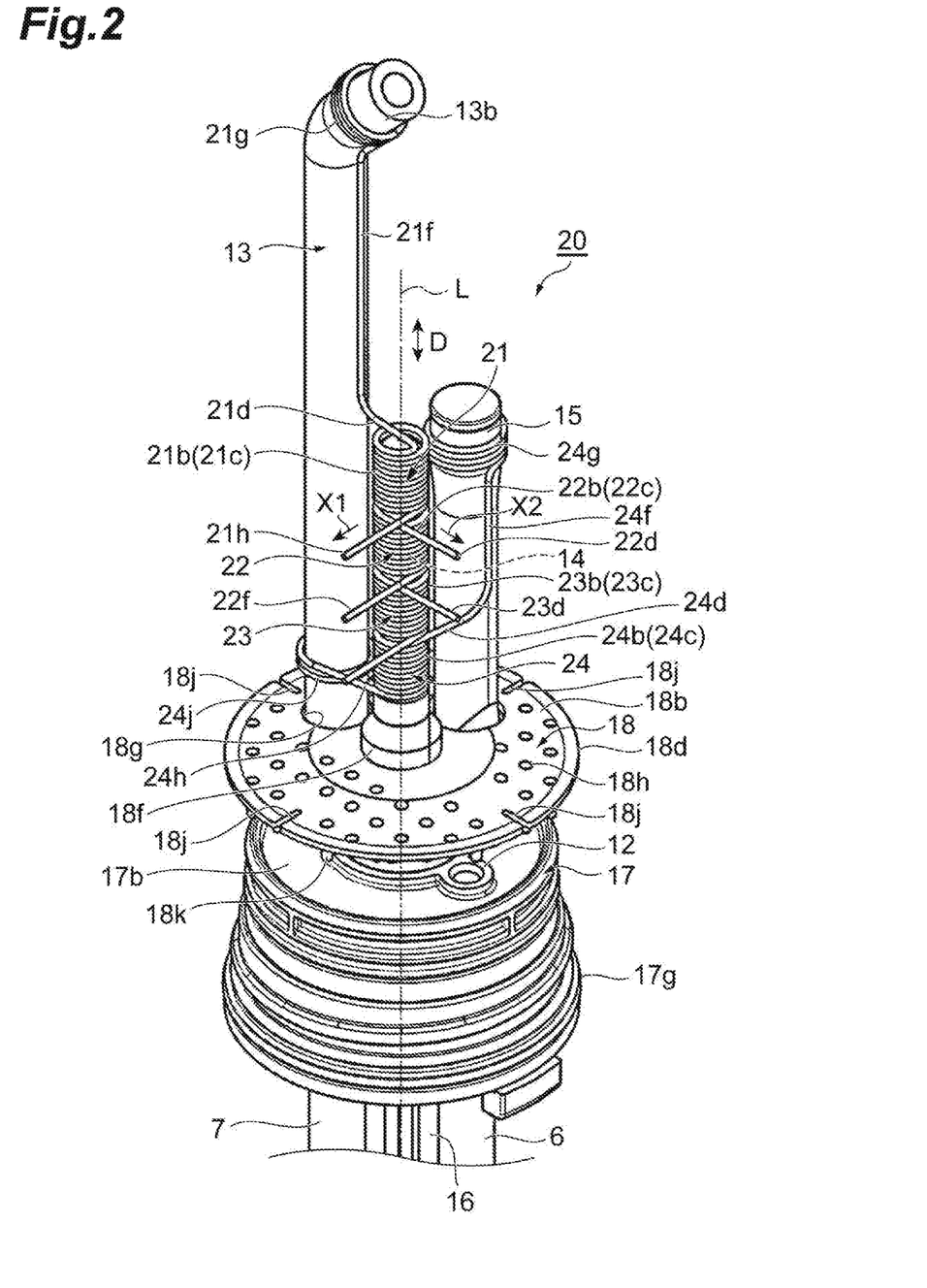
FIG. 2 is a perspective view showing a heater, coils, an inlet part, an outlet part, and a sensor part of the heating apparatus in FIG. 1.

FIG. 2 is a perspective view showing the components of the heating apparatus 1 provided in the inside of the cover part 17 and the container 11. As shown in FIGS. 1 and 2, to the cover part 17, an inlet part 12 configured to charge the washer fluid E into the accommodation space A, an outlet part 13 configured to discharge the washer fluid E from the accommodation space A, a heater 14 that heats the washer fluid E, a sensor part 15 that measures the temperature of the washer fluid E, and a deflector 18 that partitions the accommodation space A. As an example, the sensor part 15 may include a temperature sensor and a columnar part provided around the temperature sensor.

From the heater 14, a wire 16 that is electrically connected to the heater 14 extends downwards. The heater 14 and the wire 16 extend along an extending direction D in which an axis L that is the center axis line of the container 11 extends, for example. The deflector 18 functions as a baffle plate for the washer fluid E, for example. In the following, the description is made in which the direction in which the outlet part 13, the heater 14, and the sensor part 15 extend from the deflector 18 is "above" and its opposite direction is "below". However, these directions are provided for convenience of explanation, and do not limit the position or the orientation of the components, for example.

The deflector 18 is placed such that the deflector 18 contacts the inner wall surface of the above-described container 11. The deflector 18 partitions the accommodation space A into an upper space A1 and a lower space A2, and the outlet part 13, the heater 14, and the sensor part 15 extend from the deflector 18 to the upper space A1. The inlet part 12 is opened to the lower space A2 on a top surface 17b of the cover part 17, for example.

The inlet part 12 communicates with the first pipe 6, and admits the washer fluid E from the washer fluid tank 2 through the first pipe 6. That is, the inlet part 12 charges the washer fluid E supplied from the washer fluid tank 2 through the first pipe 6 into the lower space A2 of the accommodation space A.

Figure 3:
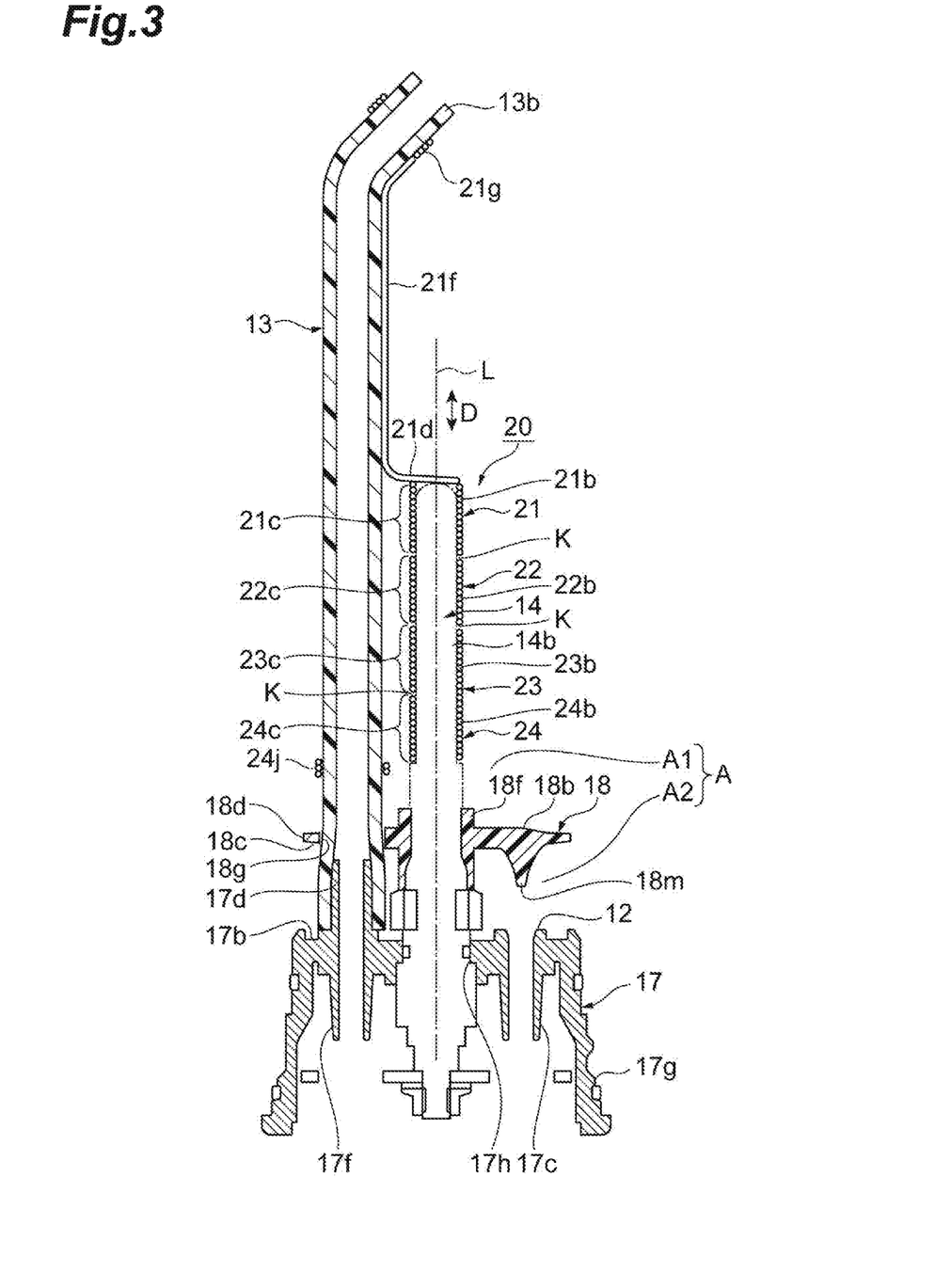
FIG. 3 is a longitudinal sectional view showing the heater, the coils, the inlet part, and the outlet part in FIG. 2.

FIG. 3 is a longitudinal sectional view showing the inlet part 12, the outlet part 13, the heater 14, the cover part 17, the deflector 18, and a coil group 20, described later. As shown in FIGS. 2 and 3, for example, the inlet part 12 and the outlet part 13 are placed at positions in symmetry to the axis L.

The cover part 17 is in a stepped annular shape having steps in the radial direction, for example. The cover part 17 includes a first tubular part 17c that forms the above-described inlet part 12 and to which the first pipe 6 is connected, a second tubular part 17d to which the outlet part 13 is connected, a third tubular part 17f to which the second pipe 7 is connected an outer edge part 17g that engages with the container 11, and an insertion part 17h into which the heater 14 is inserted.

In the cover part 17, the second tubular part 17d projects upwards from the top surface 17b, and the third tubular part 17f communicates with the second tubular part 17d, and projects downwards. The first pipe 6, the second pipe 7, and the outlet part 13 are all in a tubular shape, for example. The first pipe 6 is fit into the first tubular part 17c, the second pipe 7 is fit into the third tubular part 17f, and the outlet part 13 is fit into the second tubular part 17d. The outlet part 13 is connected to the second pipe 7 through the second tubular part 17d and the third tubular part 17f.

The outlet part 13 vertically penetrates the deflector 18, and extends above from the deflector 18. The top end of the outlet part 13 is an inclined part 13b that is obliquely bent to the axis L, and the washer fluid E in the accommodation space A is charged from the inclined part 13b to the outlet part 13. The heater 14 heats the washer fluid E accommodated in the accommodation space A, and the inclined part 13b, for example, is provided right above the heater 14, i.e., provided on the axis L.

For example, the heater 14 heats the washer fluid E located in the upper space A1. The inclined part 13*b* of the outlet part 13 is placed right above this heater 14, and thus the heated washer fluid E can be reliably discharged. For example, the inclined part 13*b* makes the washer fluid E accommodated to a predetermined fluid level H (see FIG. 1). As an example, the inclined part 13*b* is located at a place at which the volume of the washer fluid E in the accommodation space A is 90% of the capacity of the accommodation space A or less.

The heater 14 is placed along the extending direction D in which the axis L of the container 11, for example, extends. As described above, the heater 14 is placed along the axis L, and thus the deviation of the temperature profile of the washer fluid E can be reduced. Similarly to the outlet part 13, the heater 14 vertically penetrates the deflector 18, and extends above from the deflector 18.

Figure 4:
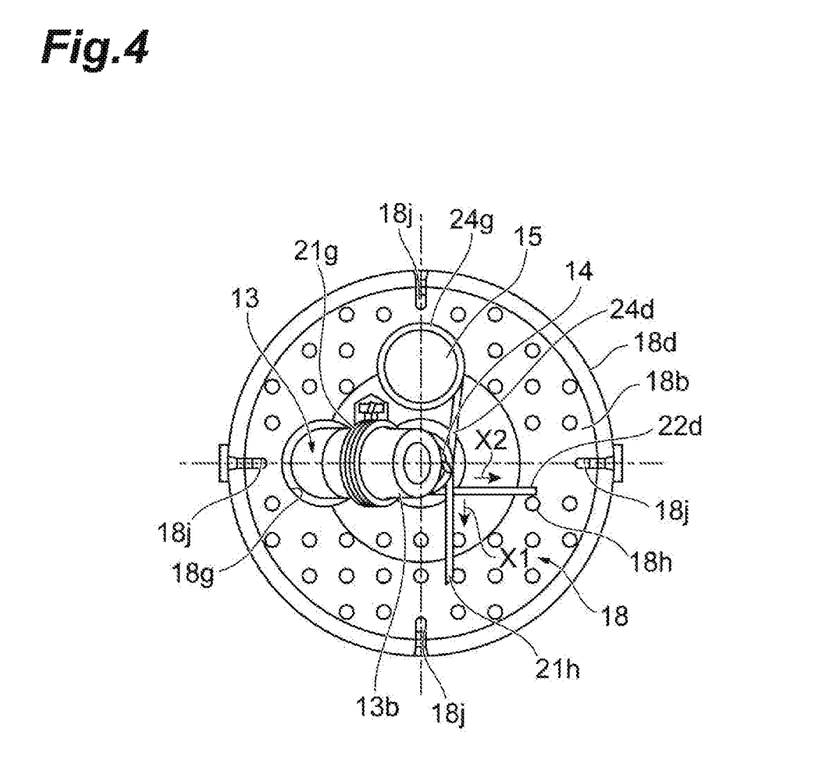
FIG. 4 is a plan view showing the heater, the coils, the outlet part, and the sensor part in FIG. 2.

FIG. 4 is a plan view showing the outlet part 13, the sensor part 15, and the deflector 18. As shown in FIGS. 2, 3, and 4, the deflector 18 is formed in a disk-shape, for example. The deflector 18 has a top surface 18*b* directed to the upper side in the accommodation space A, an under surface 18*c* located on the opposite side of the top surface 18*b*, and an outer rim 18*d* in a circular shape.

The deflector 18 is formed of a flexible material, for example. Here, the flexible material is a material that can be bent by hand, and an example of the flexible material includes a rubber material. The deflector 18 has a tubular heater insertion part 18*f* that vertically projects, and an outlet part insertion hole 18*g* into which the outlet part 13 is inserted. The heater 14 is press-fit to the heater insertion part 18*f*, and thus the heater 14 is held on the deflector 18. The outlet part 13 is inserted into the outlet part insertion hole 18*g*, and thus the outlet part 13 is held on the deflector 18.

The deflector 18 has a plurality of hole parts 18*h* that vertically penetrates the deflector 18, and the hole parts 18*h* are provided to pass the washer fluid E charged from the inlet part 12 to the upper space A1. The hole parts 18*h* are in a circular shape, for example. The plurality of hole parts 18*h* is placed being nearly equally distributed on the deflector 18, which is placed being distributed in a grid-like pattern, for example. The deflector 18 has a slit 18*j* that extends from the outer rim 18*d* in the inner radial direction of the deflector 18. The deflector 18 has four slits 18*j*, for example.

For example, the deflector 18 has a plurality of first protrusions 18*k* that projects downwards, and a second protrusion 18*m* that projects downwards longer than the first protrusion 18*k*. The plurality of first protrusions 18*k* is placed being nearly equally distributed on the under surface 18*c* of the deflector 18, which is placed being distributed in a grid-like pattern, for example. The second protrusion 18*m* is placed at a position opposite to the inlet part 12 for the washer fluid E, and has a function that disperses the washer fluid E charged from the inlet part 12 on the under surface 18*c* of the deflector 18.

As described above, the outlet part 13, the heater 14, and the sensor part 15 extend from the deflector 18, and coils 21, 22, 23, and 24 are wound around the heater 14. The coils 21, 22, 23, and 24 constitute the coil group 20, and the coils 21, 22, 23, and 24 are placed such that the coils 21, 22, 23, and 24 are arranged along the extending direction D of the axis L. For example, the coils 21, 22, 23, and 24 are wound overall on an outer surface 14*b* of the heater 14.

The coils 21, 22, 23, and 24 of the coil group 20 has a function that holds the outlet part 13, the heater 14, and the sensor part 15, for example, and a function that controls bubbles occurring with the heating of the washer fluid E by the heater 14. The function that controls bubbles using the coil group 20 will be described later in detail.

The coil 21, the coil 22, the coil 23, and the coil 24 are all coil springs, for example. The coil 21, the coil 22, the coil 23, and the coil 24 are arranged from above to below in this order. That is, the coil 23 is provided above the coil 24, the coil 22 is provided above the coil 23, and the coil 21 is provided above the coil 22.

Between the coil 21 and the coil 22, between the coil 22 and the coil 23, and between the coil 23 and the coil 24, a gap K is formed from which the outer surface 14*b* of the heater 14 is exposed. The gap K is a way for the washer fluid E heated by the heater 14, for example, to escape. As an example, the length of the gap K in the extending direction D is 0.8 mm or more and 2.2 mm or less. However, the length is appropriately changeable.

The coil 21 is formed of a wire 21*b* that is in a spiral shape extending about the axis of the coil 21 and in contact with the heater 14. The axis of the coil 21 is matched with the above-described axis L, for example. The coil 21 has a close contact part 21*c* at which the plurality of wires 21*b* is in close contact to each other in the extending direction D of the axis L. In the close contact part 21*c*, the pitch between the spirals of the wire 21*b* is zero.

Since the coil 21 has the close contact part 21*c*, at least a part of the coil 21 is a contact coil spring. Similarly to the wire 21*b* and the close contact part 21*c*, for example, the coil 22, the coil 23, and the coil 24 respectively have wires 22*b*, 23*b*, and 24*b* and respectively have close contact parts 22*c*, 23*c*, and 24*c*.

In the coils 21, 22, 23, and 24, from the micro gaps formed between the outer surface 14*b* of the heater 14 and the wires 21*b*, 22*b*, 23*b*, and 24*b*, micro bubbles occur in association with the heating of the washer fluid E, and these bubbles go away from the heater 14 while the micro state is maintained at the close contact parts 21*c*, 22*c*, 23*c*, and 24*c*.

To this, in a coil without the close contact parts 21*c*, 22*c*, 23*c*, and 24*c*, the bubbles grow from the micro state and rapidly increase their sizes, sometimes resulting in the occurrence of a boiling sound in association with a rupture of upsized bubbles. In the present embodiment, since the coil 21 has the close contact parts 21*c*, 22*c*, 23*c*, and 24*c*, small bubbles are continuously generated in a small state, the generation of small bubbles is stably performed, and thus the generation of a boiling sound is suppressed.

The inner diameter of the spiral shape portions of the wires 21*b*, 22*b*, and 23*b* of the coils 21, 22, and 23 is 6.0 mm or more and 6.2 mm or less, for example, which is nearly the same as the outer diameter of the heater 14. The inner diameter of the spiral shape portion of the wire 24*b* of the coil 24 is 6.2 mm or more and 6.6 mm or less, for example, which is greater than the outer diameter of the heater 14.

The coil 21 is fastened to the heater 14 stronger than the coil 24 is, for example. The wire 21*b* of the coil 21 is wound in a spiral shape around the upper end portion of the heater 14. The wire 21*b* has a first extending part 21*d* that extends from the upper part of the heater 14 toward the outlet part 13, for example, a second extending part 21*f* that extends from the first extending part 21*d* along the outlet part 13, and a wound part 21*g* that is wound around the inclined part 13*b* of the outlet part 13 at the top end of the second extending part 21*f*.

The first extending part 21*d* and the second extending part 21*f* are arm-shaped parts that extend outwards on the coil 21, for example, and the wound part 21*g* is a retention part that is assembled on the outlet part 13. The end portion of the wire 21b of the coil 21 on the opposite side of the first extending part 21d is a projecting part 21h that projects in the direction apart from the heater 14. As an example, the projecting part 21h projects in a first direction X1 that is a direction apart from the sensor part 15.

The wire 22b of the coil 22 is wound in a spiral shape on the upper portion of the heater 14, for example. One end of the wire 22b is a first projecting part 22d that projects in a direction apart from the heater 14. As an example, the first projecting part 22d projects in a second direction X2 that is a direction apart from the outlet part 13.

The first projecting part 22d projects in the second direction X2 that intersects with the first direction X1 directly below the projecting part 21h of the coil 21. Therefore, the projecting part 21h and the first projecting part 22d are pinched, and thus the inner diameter of the spiral portion in the coil 21 and the coil 22 can be easily adjusted.

For example, an angle formed by the first direction X1 and the second direction X2 is 60° or more and 180° or less, or 90° or more and 120° or less. The other end of the wire 22b is a second projecting part 22f that projects in the direction apart from the heater 14. For example, the second projecting part 22f projects in the first direction X1.

The wire 23b of the coil 23 is wound in a spiral shape on the lower portion of the heater 14, for example. One end of the wire 23b is a third projecting part 23d that projects in the direction apart from the heater 14. For example, the third projecting part 23d projects in the second direction X2 directly below the second projecting part 22f of the coil 22. Therefore, the second projecting part 22f and the third projecting part 23d are pinched, and thus the inner diameter of the spiral portion in the coil 22 and the coil 23 can be easily adjusted. The other end of the wire 23b projects in the first direction X1, for example.

The coil 24 has fastening force to the heater 14 weaker than that of the coil 21, the coil 22, and the coil 23, for example. Between the inner edge of the coil 24 in a spiral shape portion and the outer surface 14b of the heater 14, a gap may be formed. Thus, the setting up of the coil 24 to the heater 14 can be easily performed.

The wire 24b of the coil 24 is wound in a spiral shape on the lower end portion of the heater 14. For example, one end side of the coil 24 is wound around the sensor part 15, and the other end side of the coil 24 is wound around the outlet part 13. On the one end side, the coil 24 has a third extending part 24d that extends toward the sensor part 15, a fourth extending part 24f that extends from the third extending part 24d along the sensor part 15, and a wound part 24g that is wound around the sensor part 15 at the top end of the fourth extending part 24f. On the other end side, the coil 24 has a fifth extending part 24h that extends toward the outlet part 13 and a wound part 24j that is wound around the outlet part 13 at the end portion of the fifth extending part 24h on the opposite side of the heater 14.

On the coil 24, the third extending part 24d, the fourth extending part 24f, and the fifth extending part 24h, for example, are arm-shaped parts that extend outwards on the coil 24, and the wound part 24g and the wound part 24j are retention parts that are respectively assembled on the sensor part 15 and the outlet part 13.

Next, the operation and effect of the heating apparatus 1 for the washer fluid E according to the present embodiment will be described in detail. In the heating apparatus 1 for the washer fluid E, the heater 14 that heats the washer fluid E is provided in the accommodation space A in which the washer fluid E is accommodated, and the wires 21b, 22b, 23b, and 24b of the coils 21, 22, 23, and 24 are wound around the heater 14.

Since the wires 21b, 22b, 23b, and 24b of the coils 21, 22, 23, and 24 are wound around the heater 14 that heats the washer fluid E, the wires 21b, 22b, 23b, and 24b of the coils 21, 22, 23, and 24 surround the circumferential surface of the heater 14, and thus a boiling sound in association with heating can be suppressed. That is, the wires 21b, 22b, 23b, and 24b of the coils 21, 22, 23, and 24 are interposed between the heater 14 and the washer fluid E, which improves heat transfer between the heater 14 and the washer fluid E, and thus a boiling sound can be reduced.

In the present embodiment, since the coils 21, 22, 23, and 24 are coil springs and special production facilities are unnecessary, a structure that reduces a boiling sound can be easily produced, which contributes to a cost reduction. In the case in which the length or the outer diameter of the heater 14, for example, is changed, the lengths, numbers, or diameters of the coils 21, 22, 23, and 24 only have to be changed, there is an advantage that provides a high maintenanceability. In the case in which the coils 21, 22, 23, and 24 are coil springs, there is also an advantage that the space occupied by the coils 21, 22, 23, and 24 is small.

Furthermore, in the heating apparatus 1 for the washer fluid E, the coils 21, 22, 23, and 24 have the close contact parts 21c, 22c, 23c, and 24c at which the plurality of wires 21b, 22b, 23b, and 24b is in close contact to each other along the extending direction D of the axis L of the coils 21, 22, 23, and 24. That is, the coils 21, 22, 23, and 24 have the close contact parts 21c, 22c, 23c, and 24c at which the wires 21b, 22b, 23b, and 24b are wound in close contact to each other.

In the close contact parts 21c, 22c, 23c, and 24c, small bubbles are continuously generated in association with the heating of the washer fluid E, and thus the generation of bubbles can be stabilized, in comparison with the case in which the close contact parts 21c, 22c, 23c, and 24c are not provided. That is, in the case in which the close contact parts 21c, 22c, 23c, and 24c are not provided, large bubbles intermittently grow in association with the heating of the washer fluid E, and large bubbles rapidly grow, which sometimes causes a rupture. Therefore, since the generation of bubbles is unstable and large bubbles sometimes grow at once, the occurrence of a boiling sound is concerned.

To this, since the coils 21, 22, 23, and 24 having the close contact parts 21c, 22c, 23c, and 24c are wound around the heater 14 for the washer fluid E according to the present embodiment, small bubbles are continuously generated, and thus the growth of large bubbles can be suppressed. As a result, a boiling sound can be reduced.

The heating apparatus 1 according to the present embodiment includes the coil group 20 composed of the coils 21, 22, 23, and 24. The coils 21, 22, 23, and 24 of the coil group 20 may be placed such that the coils 21, 22, 23, and 24 are arranged along the extending direction D. Therefore, in the coil group 20, the coils 21, 22, 23, and 24 having the close contact parts 21c, 22c, 23c, and 24c are wound around, and thus a boiling sound can be more reliably reduced.

At least one of one end and the other end of the wires 21b, 22b, and 23b of the coils 21, 22, and 23 may project in the direction apart from the heater 14 (which may be a projecting part). In this case, one end or the other end, which projects, of the wires 21b, 22b, and 23b is pinched with fingers, for example, and thus the diameters of the coils 21, 22, and 23 can be easily adjusted. Thus, the setting up of the coils 21, 22, and 23 to the heater 14 can be easily performed.

At least one of one end and the other end of the coils 21 and 24 may be wound around the outlet part 13. In this case, the wires 21b and 24b of the coils 21 and 24 are wound around the outlet part 13, and thus the outlet part 13 can be supported by the coils 21 and 24. The wires 21b and 24b of the coils 21 and 24 that are wound around the heater 14 can also be wound around the outlet part 13, and thus the removal of the coils 21 and 24 can be more reliably suppressed.

The heating apparatus 1 according to the present embodiment includes the sensor part 15 that measures the temperature of the washer fluid E. At least one of one end and the other end of the coil 24 may be wound around the sensor part 15. In this case, the temperature of the washer fluid E accommodated in the accommodation space A can be measured using the sensor part 15. The wire 24b of the coil 24 wound around the heater 14 can also be wound around the sensor part 15, and thus the removal of the coil 24 can be more reliably suppressed.

As described above, the embodiment of the heating apparatus for a washer fluid according to the present disclosure is described. However, the present invention is not limited to the foregoing embodiment, and the present invention may be ones that are modified in the scope not deviating from the gist described in claims, or may be ones that are applied to another one. That is, the shapes, sizes, numbers, materials, and placement forms of the components of the heating apparatus for a washer fluid according to the present invention are appropriately changeable in the scope not deviating from the gist.

For example, in the foregoing embodiment, the rod-shaped heater 14 that extends along the axis L is described. However, the shapes, sizes, and placement forms of the heater are appropriately changeable. Moreover, the shapes, sizes, placement positions, and numbers of the wire 16 that extends from the heater 14 and the cover part 17 are not limited to the foregoing embodiment as well, and are appropriately changeable.

In the foregoing embodiment, the deflector 18 is described as a partitioning member that partitions the accommodation space A. However, the shapes, sizes, materials, and placement forms of the partitioning member are not limited to the foregoing embodiment. That is, the shapes, sizes, numbers, and placement forms of the hole parts, the slits, the first protrusion, and the second protrusion formed on the partitioning member are not limited to the above-described deflector 18 as well, and appropriately changeable.

In the foregoing embodiment, an example is described in which the coil group 20 includes four coils, the coil 21, the coil 22, the coil 23, and the coil 24. However, the number of coils that constitute the coil group may be three or less, or five or more, and is appropriately changeable. Moreover, the number of the coils may be one.

In the foregoing embodiment, examples are described in which a part of the wire 21b of the coil 21 that is wound around the heater 14 is wound around the outlet part 13, and in which a part of the wire 24b of the coil 24 that is wound around the heater 14 is wound around the sensor part 15 and the outlet part 13. However, the component around which the wire of the coil that is wound around the heater 14 may be components other than the outlet part 13 or the sensor part 15, and is appropriately changeable. Furthermore, the shapes, sizes, materials, and placement forms of the coil are appropriately changeable in the scope not deviating from the foregoing gist.

In the foregoing embodiment, an example is described in which the heating apparatus 1 is placed on the supply system S including the washer fluid tank 2, the washer fluid pump 3, the washer fluid nozzle 4, and the operating part 5. However, the heating apparatus for a washer fluid according to the present invention is applicable to various supply systems for a washer fluid, being not limited to the supply system S.

What is claimed is:

1. A heating apparatus for a washer fluid comprising:
   a container having an accommodation space configured to accommodate a washer fluid;
   an inlet part configured to charge a washer fluid into the accommodation space;
   an outlet part configured to discharge the washer fluid from the accommodation space;
   a heater provided in the accommodation space, the heater being configured to heat the washer fluid; and
   a coil wound around the heater, wherein
   the coil is in a spiral shape extending about an axis of the coil, and the coil is formed of a wire in contact with the heater, and
   the coil has a close contact part where a plurality of the wires is in close contact to each other in an extending direction of the axis.

2. The heating apparatus for a washer fluid according to claim 1, comprising
   a coil group including a plurality of the coils, wherein
   the plurality of coils included in the coil group is placed such that the plurality of coils is arranged along the extending direction.

3. The heating apparatus for a washer fluid according to claim 1, wherein
   at least one of one end and another end of the wire of the coil projects in a direction apart from the heater.

4. The heating apparatus for a washer fluid according to claim 1, wherein
   at least one of one end and the other end of the wire of the coil is wound around the outlet part.

5. The heating apparatus for a washer fluid according to claim 1, comprising
   a sensor part configured to measure a temperature of the washer fluid, wherein
   at least one of one end and the other end of the wire of the coil is wound around the sensor part.

\* \* \* \* \*